April 5, 1966   G. R. ENGLUND ETAL   3,244,367
CARRY MEANS FOR ACCOUNTING MACHINE
Filed May 15, 1963   8 Sheets-Sheet 1
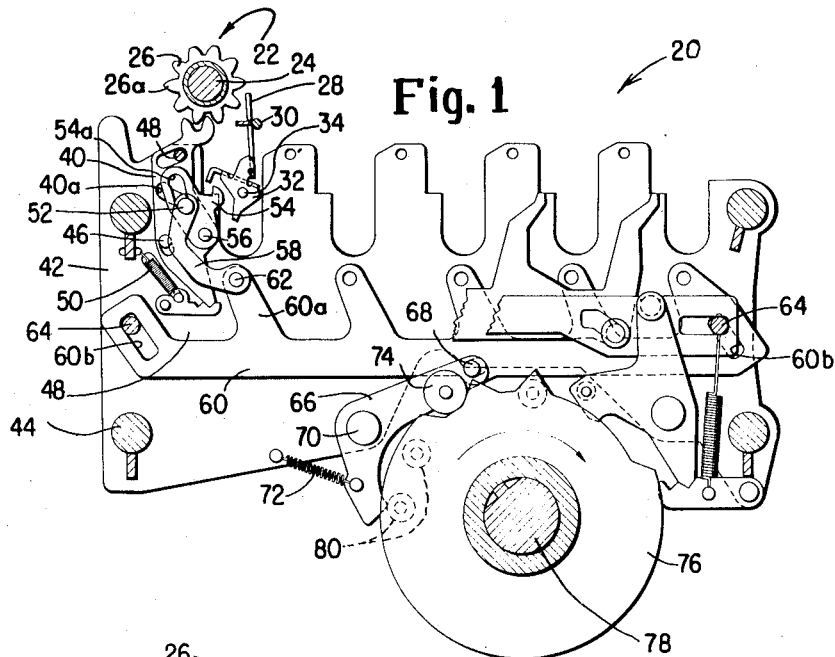
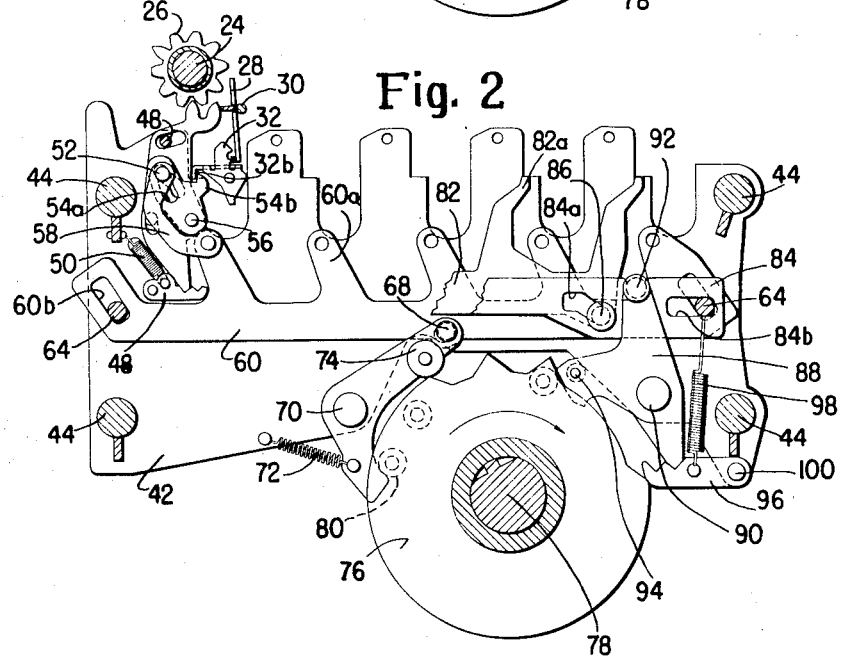
INVENTORS
GOSTA R. ENGLUND AND
MATS E. MATTSSON
by
Mason, Kolehmainen, Rathburn and Wyss
ATTORNEYS.

April 5, 1966 G. R. ENGLUND ETAL 3,244,367
CARRY MEANS FOR ACCOUNTING MACHINE
Filed May 15, 1963 8 Sheets-Sheet 2

INVENTORS
GOSTA R. ENGLUND AND
MATS E. MATTSSON
by
Mason, Kolehmainen, Rathburn and Wyss
ATTORNEYS.

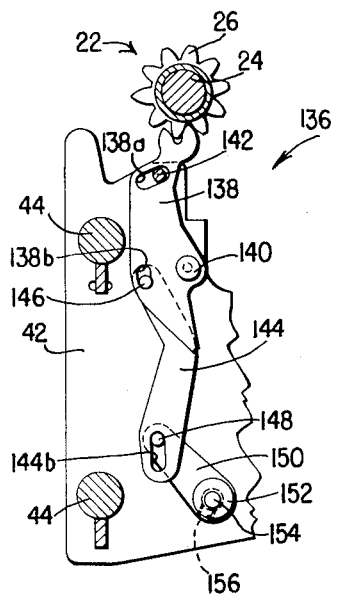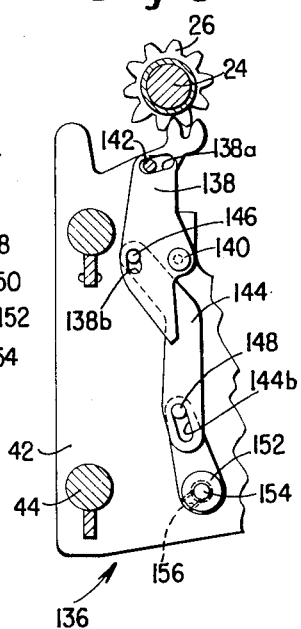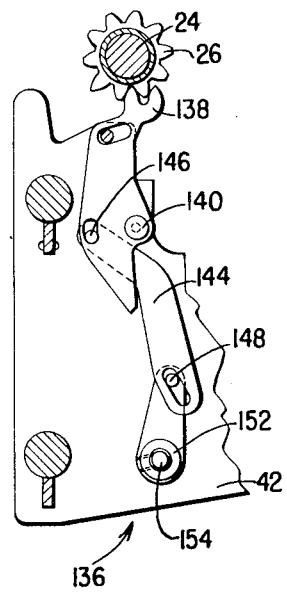

April 5, 1966　　　G. R. ENGLUND ETAL　　　3,244,367
CARRY MEANS FOR ACCOUNTING MACHINE
Filed May 15, 1963　　　　　　　　　　　　　　8 Sheets-Sheet 5

INVENTORS
GOSTA R. ENGLUND AND
MATS E. MATTSSON
by
Mason, Kolehmainen, Rathburn and Wyss
ATTORNEYS INVENTORS
GOSTA R. ENGLUND AND
MATS E. MATTSSON
by
Mason, Kolehmainen, Rathburn and Wyss
ATTORNEYS.

United States Patent Office 3,244,367
Patented Apr. 5, 1966

3,244,367
CARRY MEANS FOR ACCOUNTING MACHINE
Gösta R. Englund, Stockholm, and Mats E. Mattsson, Sollentuna, Sweden, assignors to Svenska Dataregister AB, Solna, Sweden, a corporation of Sweden
Filed May 15, 1963, Ser. No. 280,649
Claims priority, application Sweden, May 25, 1962, 5,891/62
7 Claims. (Cl. 235—137)

This invention relates to an accounting machine and, more particularly, to an accounting machine including a new and improved add-subtract totalizer.

Accounting machines having one or more add-subtract totalizers are well known. These constructions commonly include separate sets of coupled add and subtract wheels or gears on a common shaft that is axially movable between spaced add and subtract positions. Data is concurrently entered in the various orders of the totalizer under the control of the differential elements and means are provided for performing tens transfer operations between the various orders or decades of the totalizer in sequence from the lowest to the highest order. Since the sign of the total can be changed by successive entries, the totalizer assembly commonly includes means for adding a fugitive one to the lowest order of the totalizer at each sign change. This entry of a fugitive one subsequent to the initiation of the ordered series of tens transfer operations in existing accounting machines means that an additional cycle of operation of the machine must be performed before a true mathematical amount is registered in the totalizer.

Accordingly, one object of the present invention is to provide a new and improved accounting machine, such as a cash register.

Another object is to provide a cash register or other accounting unit including a new and improved add-subtract totalizer and control means therefor.

Another object is to provide an accounting machine including a new and improved means for controlling the performance of carry or tens transfer operations.

Another object is to provide an accounting machine in which means for performing an ordered series of tens transfer operations are contolled to perform more than one series of tens transfer operations during a single cycle of operation of the machine.

Another object is to provide an add-subtract totalizer assembly including new and improved means for adjusting the position of the totalizer assembly in dependence on the sign of the total in the totalizer and the mode of operation to be performed by the accounting machine.

Another object is to provide an add-subtract totalizer including new and improved means for entering a fugitive one.

In accordance with these and many other objects, an embodiment of the invention comprises an accounting machine, such as a cash register, including an add-subtract totalizer assembly. This assembly comprises a totalizer shaft carrying a plurality of order sets of add and subtract wheels or gears coupled for corresponding movement. The shaft is axially adjustable between add and subtract positions in which the add or subtract wheels are aligned with the differential entry means, and tens transfer assemblies are provided between adjacent orders of the totalizer to provide carires therebetween.

Since the total standing in the add-subtract totalizer can be changed between positive and negative signs by successive entries, the highest order of the totalizer controls an indicating means for indicating whether the standing total has a negative or positive sign. This indicating means controls a means for entering a fugitive one in the lowest order of the totalizer and also cooperates with means set under the control of the mode of operation differential assembly for controlling the axial position of the totalizer shaft in accordance with the sign of the total standing in the totalizer and the type of operation performed by the accounting machine or cash register.

Since the totalizer assembly includes means supplying a fugitive one to the totalizer whenever the sign of the total changes, novel means are provided for establishing a true mathematical value in the totalizer during a single cycle of operation of the main drive means of the cash register. This means comprises means for operating the tens transfer assembly and the indicating means associated with the highest order of the accumulator more than once during a single cycle of operation of the main drive means, the successive operations of the tens transfer means taking place at time spaced positions during a single operating cycle. In this manner, a true mathematical value representing the standing total is established in the add-subtract totalizer during a single cycle of operation of the accounting machine and without requiring a plurality of operations thereof.

Many other objects and advantages of the present invention will become apparent from considering the following detailed description in conjunction with the drawings, in which:

FIG. 1 is a detail view of one decade of a totalizer unit shown in a position during the operation of a cash register;

FIG. 2 is a detail view similar to FIG. 1 illustrating the totalizer unit at a subsequent point in the machine cycle following the completion of a carry or tens transfer operation;

FIG. 7 is a detail view of a mechanism for entering a fugitive one in the lowest order of the totalizer under the control of the mechanism shown in FIGS. 4-6, the mechanism being shown in a position representing a positive total;

FIG. 8 is a detail view similar to FIG. 7 illustrating the fugitive one entering assembly during a subsequent portion of a machine cycle in which the total standing in the totalizer has changed from positive sign to negative and has resulted in the entry of a fugitive one in the lowest order of the totalizer;

FIG. 9 is a detail view similar to FIGS. 7 and 8 illustrating the fugitive one entering mechanism as it approaches the normal position representing a negative total;

Figure 3:
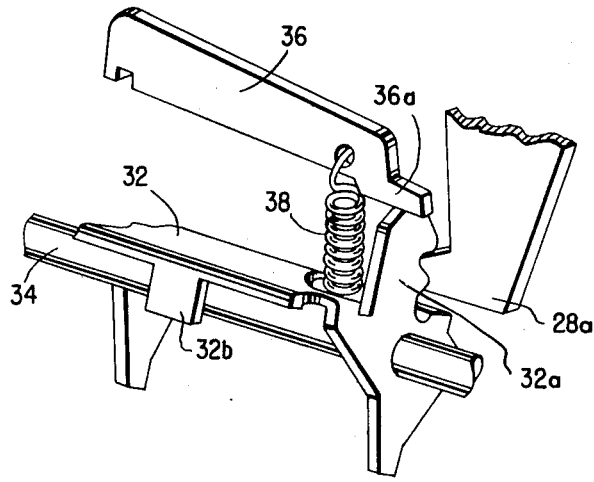
FIG. 3 is a perspective view of an indicating means or control for the tens transfer mechanism provided in the totalizer shown in FIGS. 1 and 2.

Referring now more specifically to FIGS. 1–3 of the drawings, therein is illustrated a totalizer assembly 20 including an add-subtract totalizer assembly 22 which is adapted to provide, for instance, credit-balance operations and which embodies the present invention. The general arrangement and construction of the totalizer assembly 20, the actuating means therefor as well as the construction and operation of the accounting machine or cash register in which it is used can be of any suitable known type but preferably comprises the construction and arrangement shown and described in detail in the copending application of Gösta R. Englund et al., Ser. No. 179,595, filed Mar. 14, 1962, which application is assigned to the same assignee as the present application. The add-subtract totalizer assembly 22 includes an axially adjustable shaft 24 on which a plurality of pairs of add-subtract wheels or drums coupled for corresponding movement are rotatably mounted. The construction of the add and subtract wheels and the coupling means therefor can be of any suitable type. Although the capacity of the totalizer assembly 22 can be varied in accordance with requirements, the illustrated assembly 22, of which one order or decade is illustrated in FIGS. 1 and 2, includes nine orders or decades.

To provide means for indicating the need for a tens transfer or carry operation from any given one of the decades or orders to the next highest order, a plate 28 is pivotally mounted on a supporting rod or shaft 30 adjacent each of the decades. Each of the plates 28 includes a depending lug or foot portion 28a (FIG. 3) which is disposed adjacent an upstanding arm 32a on an indicator bracket 32 that is pivotally mounted on a rod 34 carried by the totalizer frame. When one of the add or subtract wheels 26 passes through a zero position in either a forward or reverse direction, an elongated tooth, such as the elongated tooth 26a (FIG. 1), bears against the plate 28 and pivots it in a clockwise direction so that the foot portion 28a pivots the indicating bracket 32 in a counter-clockwise direction about the rod 34 to the position shown in FIG. 2 in which it indicates the need for a carry operation from the lower order associated with the displaced plate 28 to the higher order with which the bracket 32 is associated. The bracket 32 is selectively latched in either of its two positions by a latching arm 36 (FIG. 3) pivotally mounted at one end on a supporting frame and provided at its other end with a portion 36a that is biased into engagement with the pointed or tapered upper end of the arm 32a on the bracket 32 by a tension spring 38 connected between the rod 34 and the arm 36.

The add-subtract totalizer assembly 22 is shown in a normal or lowered position in FIGS. 1 and 2 of the drawings from which it is elevated to permit its adjustment and actuation by the related differentially settable elements. As illustrated in line 1 of FIG. 15, the add-subtract totalizer assembly 22 is elevated into coupled engagement with the differential assemblies in the cash register in the interval between 210° and 260° of rotation of the main shaft of the cash register. The differential elements of the cash register or accounting machine are reset to their normal positions in the interval between 210° and 255° of rotation of the main shaft (see line 2 in FIG. 15). Thus, either the set of add wheels or the set of subtract wheels, in dependence on the nature of the operation, are coupled to the differential elements to receive a plural digit entry during the resetting movement of the differential elements. During this movement of the wheels 26 of the add-subtract totalizer 22, the tens transfer or carry brackets 32 are selectively operated from inactive to active or transfer representing settings under the control of the elongated teeth 26a on the wheels 26. After the totalizer shaft 24 has been lowered to the normal position shown in FIGS. 1 and 2 in the interval between 260° and 270° of rotation of the main drive means, tens transfer or carry operations are selectively performed in the various decades or orders of the totalizer assembly 22 under the control of the plurality of indicating means 32.

The tens transfer mechanisms each include a transfer lever or arm 40 which is provided at its upper end with a bifurcated portion in which is received one of the teeth of the wheel 26 when the add-subtract totalizer 22 is in its lowered or normal position. The tens transfer assemblies for each decade are mounted between adjacent ones of a plurality of divider or supporting plates 42 which are secured in spaced positions by a plurality of rods 44. Each of the tens transfer levers 40 is movably mounted between a pair of plates 42 by a pair of pins 46 and 48 which are received within elongated slots in the lever 40. The lever 40 is held in either its normal position (FIG. 1) or in an operated position (FIG. 2) by a two position latch 48 which is resiliently biased into engagement with the lower end of the transfer lever 40 by a connected tension spring 50.

To provide means for operating the transfer lever 40, the lever 40 is provided with a slot 40a into which extends a pin 52 which also passes through a slot 54a in an arm 54 that is pivotally mounted on the lever 40 by a pivot pin 56. The pin 52 is carried on one end of a link 58, the other end of which is pivotally connected to an upstanding portion 60a on an operator slide 60 by a pivot pin 62. The slide 60 is movably mounted between a pair of adjacent plates 42 by a plurality of pins 64 that co-operate with the elongated and inclined slots 60b in the slide 60. The slide 60 is actuated by a cam follower lever 66 which is pivotally connected to the slide 60 by a pivot pin 68 and which is pivotally mounted on one of the supporting plates 42 by a pivot pin 70. A tension spring 72 connected between the frame 42 and one end of the cam follower lever 66 biases a roller 74 carried on one end of the lever 66 into engagement with the outer periphery of a cam 76 that is keyed to a main shaft 78 of the cash register. The other end of the cam follower lever is adapted to engage one of a plurality of rollers 80 carried on the side of the cam 76.

Figure 15:
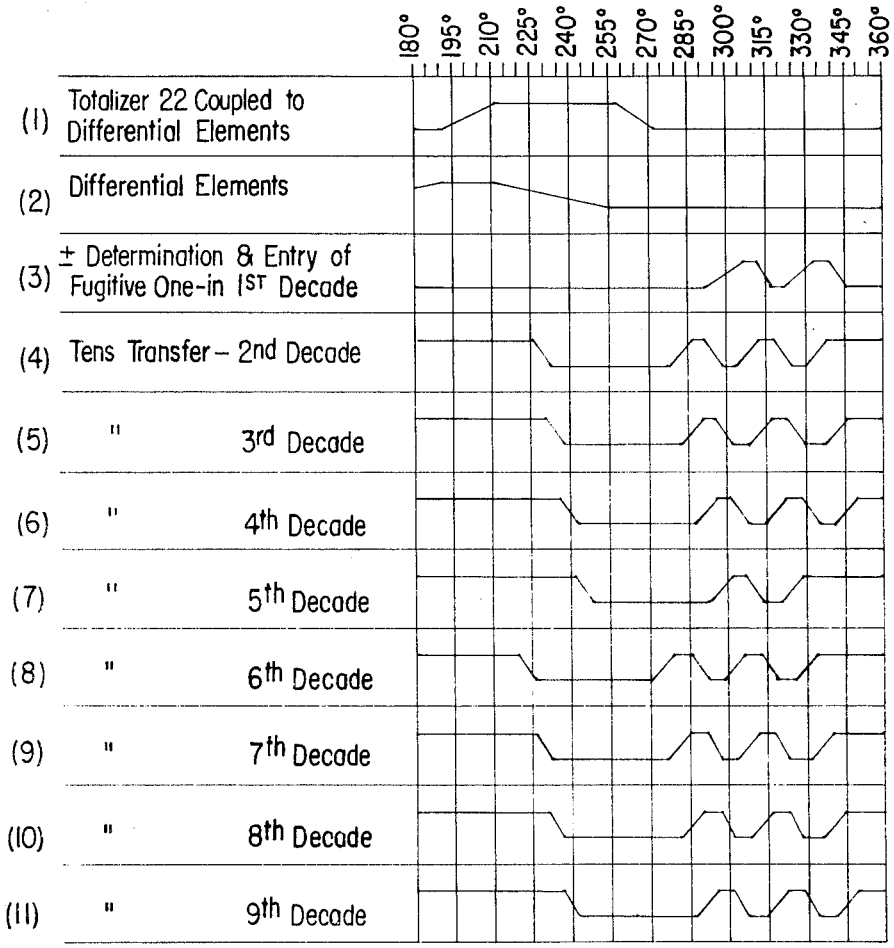
FIG. 15 is a timing diagram illustrating the timed sequence of operation of certain accounting machine components including the tens transfer means for various decades of the totalizer.

As indicated above, the tens transfer operations are performed following the completion of the return of the add-subtract totalizer assembly 22 to its normal position. FIGURES 1 and 2 of the drawings illustrate the sixth decade of the totalizer assembly 22 which, as illustrated in line 3 of FIG. 15, is actuated at three separate times during a single cycle of rotation of the main drive means 78 to perform a tens transfer or carry operation at one of three spaced times during the single cycle of rotation. The tens transfer or carry operation can take place during only one of these three actuations in dependence on the time at which the indicating bracket 32 is set. In FIG. 1 of the drawings, the tens transfer assembly is illustrated in the interval between 320° and 325° of rotation of the main shaft 78 at which time the tens transfer assembly in the sixth decade has been actuated two times. As the control cam 76 continues to move in a clockwise direction from the position shown in FIG. 1 to the position shown in FIG. 2, the cam follower lever 66 is pivoted in a counterclockwise direction about the shaft 70 by the engagement of the lever 66 with the third roller 80 and of the roller 74 with the periphery of the cam 76. This moves the slide upwardly and to the left to force the connected link 58 in the same direction. The upwardly directed movement of the pin 52 within the slots 40a and 54a actuates the elements 40 and 54 to provide a differential action for selectively actuating the lever 40.

When a tens transfer operation is not to be performed, the arm 54 is free to move and the transfer lever 40 is latched in the position shown in FIG. 1 by the latch 48. This causes the pin 52 to follow the outline of the slot 40a and pivot only the member 54 in a clockwise direction about the pin 56. This results in all of the movement of the link 58 being taken up by movement of the element 54 and none by movement of the element 40.

If a carry is to be made from the lower or fifth decade into the illustrated sixth decade, the bracket 32 in the sixth decade is pivoted about the shaft 34 to the active or carry indicating position shown in FIG. 2 in which the depending portion 32b engages a projection 54b on the arm 54. Accordingly, when the slide 60 and the link 58 move upwardly, the arm 54 is latched against counterclockwise movement about the pivot pin 56, and the transfer lever 40 is forced to the right to the position shown in FIG. 2. Because of the engagement between the bifurcated upper end of the tens transfer lever 40 and one of the teeth on the add or subtract wheel 26, a single increment of value is carried into the wheels in the sixth decade of the add-subtract totalizer 22. In moving from the position shown in FIG. 1 to the position shown in FIG. 2, the lower of the tens transfer lever 40 cams the free end of the latch 48 against the action of the spring 50 to permit the tens transfer lever 40 to be latched in the operated position shown in FIG. 2.

The described tens transfer operation takes place in the interval between approximately 325° and 332° of rotation of the main shaft 78 and is the last of three separate tens transfer of carry operations performed in the sixth decade. The preceding two tens transfer operations are performed in the same manner in the intervals between 270° and 277° and 300° and 307° of rotation of the main shaft 78. If the completed tens transfer operation described had taken place during one of the first two actuations of the tens transfer assembly because of a movement of the indicator bracket 32 to the active position shown in FIG. 2, the operation of the tens transfer assembly is somewhat modified during any after occurring actuations.

More specifically, when the link 58 is moved upwardly with the tens transfer lever 40 latched in the position shown in FIG. 2 by the latch 48 and with the indicator bracket 32 in the position shown in FIG. 2, the upwardly directed movement of the pin 52 cannot move the transfer lever 40 to the left because of the latch 48. Thus the differential action provided by the upwardly moving pin 52 is taken up solely by pivotal movement of the arm 54 in a clockwise direction about the pin 56. The arm 54 is latched against only counterclockwise movement by the active or set indicator bracket 32. Therefore, a carry operation is not performed more than once even though the carry assembly is operated a plurality of times.

The third or last tens transfer operation, described above, takes place in the interval between approximately 325° and 332° of rotation of the main shaft 78 (see line 8 in FIG. 15). During the remainder of this cycle of rotation of the main shaft 78 and during the next 220° of rotation of the following cycle of operation, the lever 66 remains in its counterclockwise deflected position in which the operating slide 60 is elevated. In the interval between 220° and 225° of this following cycle of rotation, the roller 74 engaging the outer edge of the cam 76 and the end of the cam follower lever 66 engaging the rollers 80 permit the lever 66 to move in a clockwise direction about the shaft 70 under the influence of the tension spring 72 to restore the operating slide 60 to its lower position. This operating slide is then elevated or actuated by the cam follower lever 66 three successive times during the completion of this cycle of operation. Thus, the tens transfer assembly in the sixth decade checks the position of the tens transfer bracket 32 controlled by the next lowest or fifth decade of the add-subtract totalizer 20 three times during a single cycle of revolutions of the main shaft 78.

Figure 5:
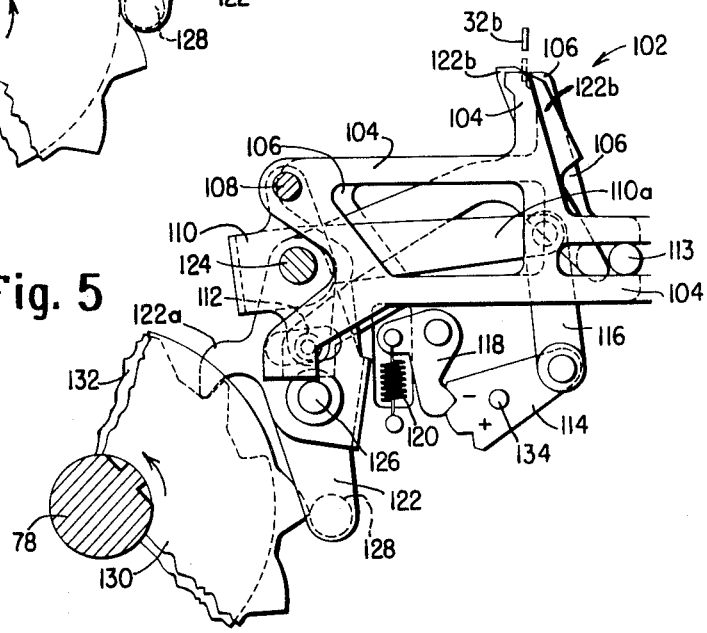
FIG. 5 is a detail view similar to FIG. 4 illustrating the apparatus in a subsequent portion of the operating cycle of the cash register in which the detecting means has been actuated to a position representing a negative total standing in the totalizer.
Figure 10:
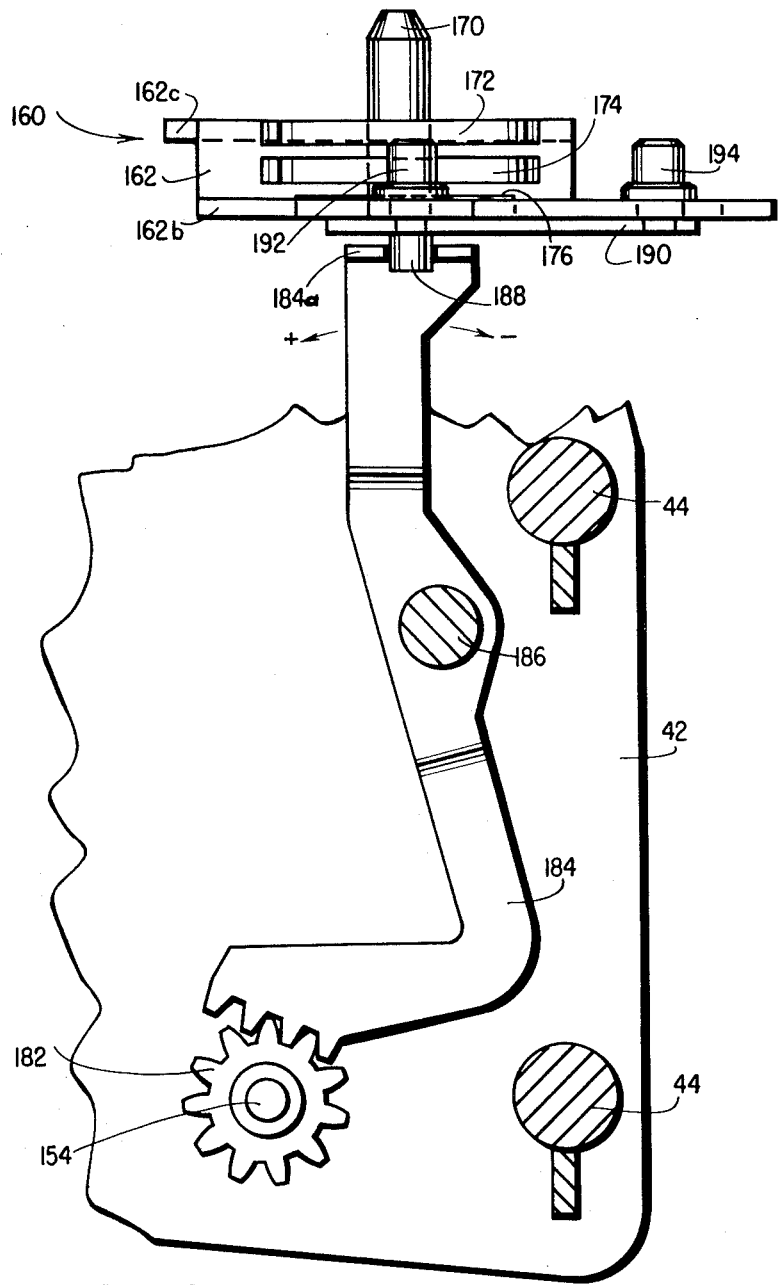
FIG. 10 is a fragmentary elevational view of a mechanism for controlling the axial position of the totalizer shaft in dependence on the sign of the total and the mode of operation for which the accounting machine or cash register has been conditioned.

In a similar fashion, each other decade of the totalizer assembly 20 is actuated to perform a tens transfer operation at least two times during each cycle of operation of the cash register so that it is possible to complete all of the necessary transfer action which may be caused by the entry of the fugitive one during a single cycle of operation of the cash register. This means that a true arithmetical total is provided by the assembly 22 following any cycle of operation in which the add-subtract totalizer 22 is used. Lines 4–11 of FIG. 5 illustrate the times at which the tens transfer mechanisms in the various decades are operated. Tens transfers can be performed concurrently in different ones of the decades in the totalizer assembly 22. As an example tens transfer operations in the second decade (see line 4 in FIG. 15) and the seventh (see line 9 in FIG. 15) are carried out concurrently.

The tens transfer indicating brackets 32 are reset to an inactive or normal position shown in FIGS. 1 and 3 by a resetting slide 82 having a plurality of upwardly extending portions 82a, the upper ends of which are disposed immediately below the depending lip 32b when the bracket 32 is in its set or carry indicating position shown in FIG. 2. The resetting slide 82 is actuated by a slide 84 having a slot 84a in which is received a pin 86 carried on the slide 82. The slide 84 also includes a plurality of slots 84b through which the pins or rods 64 extend to guide the slide 84 for horizontal movement. A cam follower lever 88 pivotally mounted on the plate 42 by a pivot pin 90 is connected by a pin or roller 92 at its upper end to the slide 84 and includes a roller 94 adapted to engage the forward roller 80 on the cam 76.

When the bracket 32 is to be reset following the last elevation of the slide 60, the roller 94 on the cam follower lever 88 engages the forward roller 80 on the cam 76 to pivot the lever 88 in a clockwise direction about the pivot pin or shaft 90 to an operated position in which it is held by a latch 96 biased by a tension spring 98 in a counterclockwise direction about a pivot pin 100. This moves the slide 84 to the right so that the pin or roller 86 is cammed upwardly by the slot 84a to move the resetting slide 82 upwardly. During this movement of the slide 82, the projecting portions 82a engage the lower ends of the depending tongues or lugs 32b to pivot any set ones of the indicating brackets 32 in a clockwise direction about the shaft 34 to restore them to the normal position shown in FIGS. 1 and 3. When the cam follower lever 88 is pivoted in a counterclockwise direction about the shaft so that the slide 84 moves to the left, the slot 84a engages the pin or roller 86 to lower the resetting slide 82 to its normal position.

Figure 6:
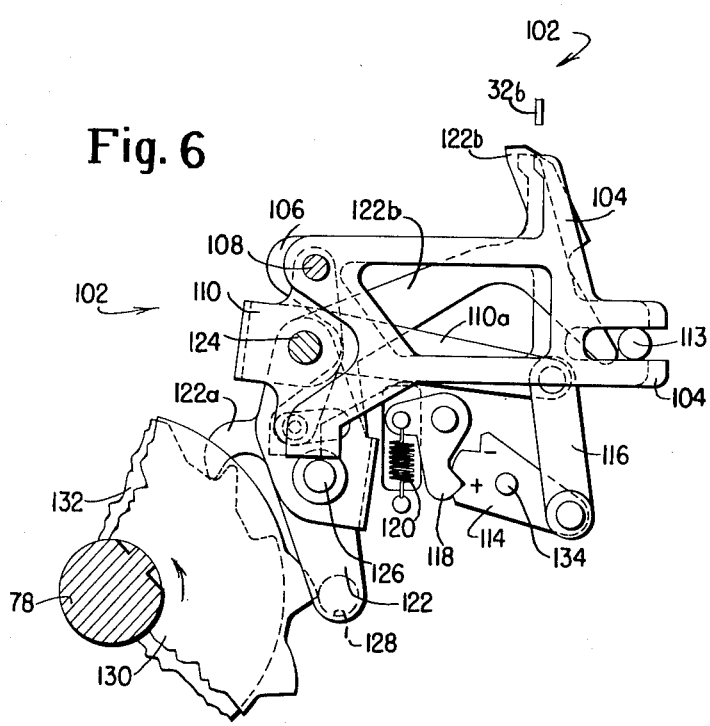
FIG. 6 is a detail view similar to FIGS. 4 and 5 illustrating the sign detecting means in the same portion of the machine cycle as FIG. 5 but in which the sign of the total standing in the totalizer has not changed so that the detecting means remains in a position representing a positive total.
Figure 4:
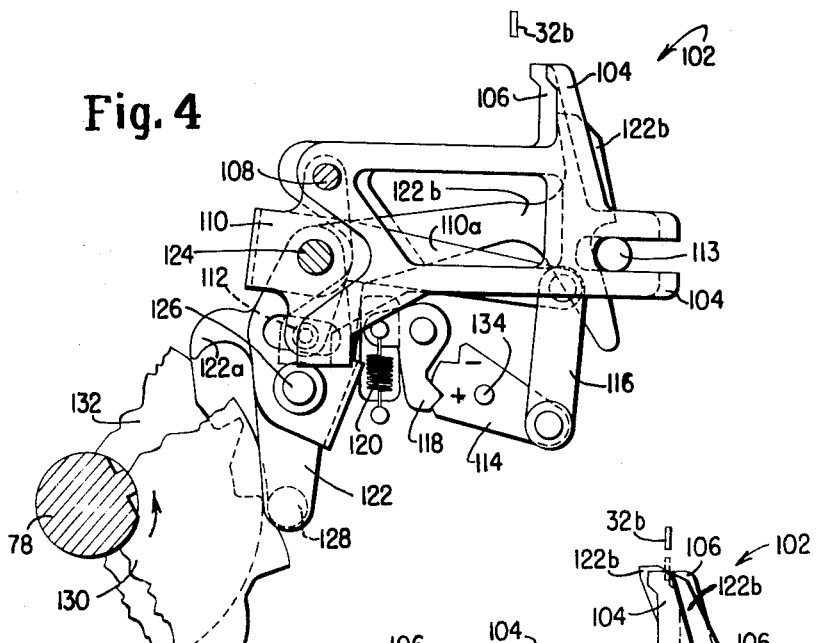
FIG. 4 is a fragmentary detail view of a mechanism for determining the positive or negative sign of the total standing in the totalizer shown in a position representing a positive total.

FIGURES 4–6 of the drawings illustrate a detecting assembly 102 for providing a continuous indication of the positive or negative sign of the total standing in the add-subtract totalizer 22. This assembly is driven by the main shaft 78 of the cash register in synchronism with the remaining operations of the cash register and is selectively controlled by the transfer bracket 32 whose setting is controlled by the ninth or highest order of the totalizer 22.

The sign determining assembly 102 includes a positive sign detecting bracket 104 and a negative sign detecting bracket 106 which are spaced from each other. When the add-subtract totalizer 22 is moved in a direction out of the paper (FIG. 4) to move the lug 32b on the highest order indicating bracket 32 out of the paper, the upper end of the add bracket 104 is aligned with the lug 32b. Similarly, when the add-subtract totalizer 22 is moved into the page in FIG. 4 to move the highest order indicating bracket 32 to a similar position, the lug 32b is moved into alignment with the negative detecting bracket 106. In the normal position representing an absence of a carry from the highest order of the totalizer 22, the lug 32b is disposed in alignment with one of but above the path of movement of both of the detecting brackets 104 and 106. Alternatively, when the need for a fugitive one is indicated by a carry from the totalizer 22 when set in either an add or a subtract position, the lug 32b is depressed to a position such as shown in dashed line in FIG. 5 in which it intersects the path of movement of a selected one of the two detecting brackets 104 or 106.

The bracket 104 is pivotally mounted at its forward end by a shaft 108 on the upper end of a somewhat U-shaped bracket 110. The forward end of the detecting bracket 106 is pivotally mounted on a lower end of the bracket 110 by a pivot pin 112 (FIG. 4). The brackets 104 and 106 each include a slot in which a pin 113 is slidably mounted to guide their movement. A rearwardly extending arm 110a of the U-shaped bracket is pivotally connected to a plus and minus indicating arm 114 by a pivotally connected link 116. A pawl or detent 118 resiliently biased into engagement with the notched end of the indicating arm 114 by a connected tension spring 120 secures the arm 114 and, thus, the bracket 110 in either of its pair of adjusted positioned representing a positive or negative total in the totalizer assembly 22. In the position shown in FIGS. 4 and 6, the arm 114 is in a positive total representing position. In the position shown in FIG. 5, the arm 114 represents a negative total.

The U-shaped bracket 110 is pivotally mounted on one end of a cam follower supporting structure 122 by a pivot pin or shaft 124, and the cam follower means 122 is, in turn, pivotally mounted on the supporting frame for the cash register by a shaft 126. A roller 128 and a projecting portion 122a on the cam follower means 122 are adapted to engage the outer peripheries of a pair of cams 130 and 132, respectively, that are keyed to the main shaft 78 of the cash register. The cam follower means 122 also includes a rearwardly extending portion 122b with an upper surface that is used to selectively reset the depending lug 32b on the indicating bracket for the highest order of the totalizer 22.

During a cycle of operation of the cash register or accounting means and in the interval between 287° and 305° of rotation (see line 3 in FIG. 15), the cams 130 and 132 pivot the cam follower means 122 in a counterclockwise direction about the shaft 126 so that the bracket 110 is moved to the left from the position shown in FIG. 4 toward the position shown in FIGS. 5 and 6. Assuming that the totalizer 22 has not been operated during the preceding cycle from a setting representing a total of one sign to a total of the opposite sign, the lug 32b on the indicating bracket 32 remains in the position shown in FIGS. 4 and 6 spaced above the path of movement of both of the detecting brackets 104 and 106 regardless of the axial position of the totalizer shaft 24. Thus, when the cam follower means 122 is moved in a counterclockwise direction about the shaft 126 from the position shown in FIG. 4 to the position shown in FIG. 6, the movement to the left of both of the brackets 104 and 106 is uninterrupted, and the indicating arm 114 remains in its previously set position in which it is latched by the pawl or dentent element 118. During the interval from 310° to approximately 315°, the cam follower means 122 is pivoted in a clockwise direction about the shaft 126 to restore the assembly 102 to substantially the condition shown in FIG. 4. The cam follower means 122 is again pivoted in a counterclockwise and then a clockwise direction in the interval between 320° and 345° of rotation of the main shaft 78 (see line 3 in FIG. 15) to make a second test for the presence of a transfer or carry condition from the highest order of the totalizer 22 resulting in a fugitive one entry in the lowest order. If transfer conditions have not been established in the highest order of the totalizer 22, these two operations of the assembly 102 do not result in a shift in the position of the arm 114 and the former indication remains.

Assuming, however, that the indicating bracket 32 associated with the highest order of the totalizer is set during either the operation of the totalizer 22 in a subtract position or as a result of a tens transfer or carry operation resulting from an operation, the lug 32b moves to the position shown in dashed outline in FIG. 5. When the two brackets 104 and 106 move to the left as a result of the counterclockwise pivotal movement of the cam follower means 122 about the shaft 126 (see line 3 of FIG. 15), the movement to the left of the negative balance detecting bracket 106 is arrested by engagement with the lug 32b, the movement of the positive detecting bracket 104 being unimpeded. When movement of the negative total detecting bracket 106 is interrupted, the shaft or pivot pin 112 becomes fixed in position so that further movement of the shaft 124 to the left to the position shown in FIG. 5 results in counterclockwise pivotal movement of the bracket 110 about the shaft 124. This pulls the link 116 upwardly to the position shown in FIG. 5 and pivots the indicating arm 114 which is rigidly secured to a pivotally mounted shaft 134 in a counterclockwise direction about the axis of the shaft 134 so that the detent 118 and the tension spring 120 now secure the arm in its negative sign representing position illustrated in FIG. 5 of the drawings.

During this counterclockwise movement of the cam follower means 122 about the axis of the shaft 126, the arm 122b thereon moves upwardly in the manner illustrated in FIGS. 5 and 6 of the drawings to engage the lower edge of the lug 32b and pivot it in a clockwise direction about the shaft 34 to restore the tens transfer bracket 32 for the highest order of the add-subtract totalizer assembly 22 to its normal position. When the cam follower means 122 is pivoted in a clockwise direction about the shaft 126 toward the normal position shown in FIG. 4, the arm 122b is retracted below the detecting brackets 104 and 106, and the bracket 110 is moved to the right to move the detecting brackets 104 and 106 to their normal positions. The arm 114 remains set in the negative condition until such time as the total standing in the add-subtract totalizer 22 passes from a negative value to a positive value.

A fugitive one assembly 136 is illustrated in FIGS. 7–9 of the drawings. The assembly 136 is selectively controlled by the sign detecting assembly 102 to enter a fugitive one in the lowest order of the add-subtract totalizer assembly 22 in response to each transition between a positive and negative total in this totalizer. The totalizer wheel or gear 26 illustrated in FIGS. 7–9 can comprise either the add or subtract wheel in the lowest order of the totalizer assembly 22 in dependence on the axial setting of the totalizer shaft 24. As in the tens transfer assembly shown in FIGS. 1 and 2, one of the teeth on the selected wheel 26 is engaged by the bifurcated upper end of a transfer lever 138 when the totalizer assembly 20 is restored to its normal or lower position following the transfer of information between the totalizer and the differential elements (see line 1 in FIG. 15).

The transfer lever 138, which provides means for entering a fugitive one in the lowest order of the add-subtract totalizer 22, is pivotally mounted on the supporting frame or plate 42 by a pivot pin 140 and includes a slot 138a in which a pin 142 is disposed to limit the pivotal movement of the lever 138. The upper end of a coupling link 144 carries a pin 146 which is received within an elongated slot 138b in the transfer lever 138. The lower end of the link 144 includes an elongated slot 144b in which is slidably received a pin 148 secured to the free end of an arm 150, the other end of which is secured to a hub 152. The hub 152 is secured to a shaft 154 that is pivotally mounted on the supporting plate 42.

To provide means for operating the fugitive one entering means 136 in response to operation or actuation of the sign detecting assembly 102, the shaft 134 (FIGS. 4–6) which pivots between two angularly spaced positions is rigidly secured to the hub 152 by a set screw 156. In FIG. 7, the arm 150 and the hub 152 are set in a position representing positive total in the totalizer 22 and corresponds to the position of the arm 114 shown in FIGS. 4 and 6.

Assuming that the totalizer 22 passes from a positive total to a negative total, the arm 114 and the shaft 134 move from the position shown in FIG. 4 to the position shown in FIG. 5. In doing so, the shaft 134 turns the hub 152 and the connected arm 150 from the position shown in FIG. 7 to the position shown in FIG. 8. In this movement, the pin 148 engages the upper end of the slot 144b in the link 144 so that this link is forced upwardly to bias the pin 146 against the upper end of the slot 138b. This pivots the transfer lever 148 in a clockwise direction about the pivot pin 140 so that the bifurcated upper end of the lever 138 moves the engaged tooth on the wheel 26 to rotate this wheel a single step in a counterclockwise direction about the axis of the totalizer shaft 24, thereby entering an increment of value or a fugitive one in the lowest order of the add-subtract totalizer assembly 22.

As the arm 150 continues movement in a clockwise direction about the axis of the shaft 154 from the position shown in FIG. 8 to the position shown in FIG. 9, which position is determined by the latched position of the arm 114 shown in FIG. 5, the arm 150 and the link 144 pass over center so that the link 144 drops to a position in which the pin 146 rests on the lower end of the slot 138b and the pin 148 is disposed in a somewhat central position within the slot 144b. When the totalizer assembly 20 is next operated to elevate the shaft 24 to an intermediate or upper position, the transfer or fugitive one entering lever 138 is engaged and pivoted in a counterclockwise direction about the shaft 140 using the construction and method disclosed in the above-identified copending Englund et al. application. This resets the lever 138 to its normal position shown in FIG. 7. However, the hub 152, the arm 150, and the link 144 remain in substantially the same position illustrated in FIG. 9 of the drawings inasmuch as the indicating arm 114 of the detecting assembly 102 remains in the negative total indicating position shown in FIG. 5 of the drawings.

When the total standing in the totalizer 22 changes from a negative value to a positive value so that the shaft 154 is rotated in a clockwise direction about its axis, the corresponding counterclockwise rotation of the arm 150 and the hub 152 about the axis of the shaft 154 again elevates the link 144 and pivots the transfer lever 138 in a clockwise direction about the shaft 140 so that a single increment of value is again entered into the engaged one of the wheels 26 in the lowest order of the add-subtract totalizer 22. Thus, the adjustment of the totalizer between settings representing positive and negative values results in the entry of a fugitive one in the lowest order of the add-subtract totalizer 22.

An assembly 160 for adjusting the axial position of the add-subtract totalizer 22 is illustrated in FIGS. 10–14 of the drawings. The assembly 160 is controlled in part to position the shaft 24 in dependence on the mode of operation for which the accounting machine or cash register is conditioned and is further controlled to adjust the axial position of the shaft 24 in dependence on the positive or negative nature of the total standing in the assembly 22.

The assembly 160 includes a cam plate 162 having a lug 162a (FIGS. 11–14) interlocked with one end of the axially movable totalizer shaft 24. The plate 162 also includes a lower level 162b and an upper level 162c. A shaft or pin 164 carried on the housing of the accounting machine is slidably received within a slot 166 (FIGS. 11–14) for guiding sliding movement of the plate 162. The plate 162 is also provided with a central opening 168.

To provide means for adjusting the position of the plate 162 and, thus, of the shaft 24 in dependence on the mode of operation for which the accounting machine or cash register is conditioned, the assembly 160 includes a shaft 170 whose position about a fixed axis relative to the machine is angularly adjusted in accordance with the mode or type of operation for which the accounting machine is adjusted. The shaft 170 is provided with three spaced cam members or disks 172, 174, and 176. The upper cam disk 172 and the lower cam disk 176 are aligned, respectively, with the upper level 162c and the lower level 162b of the plate 162 and include patterned or coded outer edges adapted to engage cam follower projections 178 and 180 on the upper and lower levels 162c and 162b, respectively. Thus, the angular adjustment of the shaft 170 moves different combinations of surfaces on the cams 172 and 176 into engagement with the projections 178 and 180, respectively, to shift the plate 162 to the left or to the right between a left-hand add position and a right-hand subtract position in accordance with the type of operation for which the accounting machine is conditioned. The intermediate control cam 174 is used to control the setting of the axial position of the shaft 24 in accordance with both the type of operation for which the accounting machine has been adjusted and the positive or negative nature of the total standing in the totalizer 22.

To provide the assembly 160 with information representing the sign of the totalizer total, the shaft 154 (FIGS. 7–9) is rigidly secured to a pinion gear 182 (FIG. 10) that meshes with a gear segment on the lower end of a lever 184 that is pivotally mounted on one of the frame elements 42 by a pivot pin 186. The upper end of the lever 184 is provided with a bifurcated outwardly extending horizontal portion 184a in which is received a pin 188 that is secured to the lower surface of a plate 190 to which two pins 192 and 194 are secured. The pin 192 extends upwardly through a slot 196 (FIG. 12) in the lower level 162b of the plate 162, and the pin 194 extends upwardly through a similarly located slot 198 in the plate 162.

Figure 13:
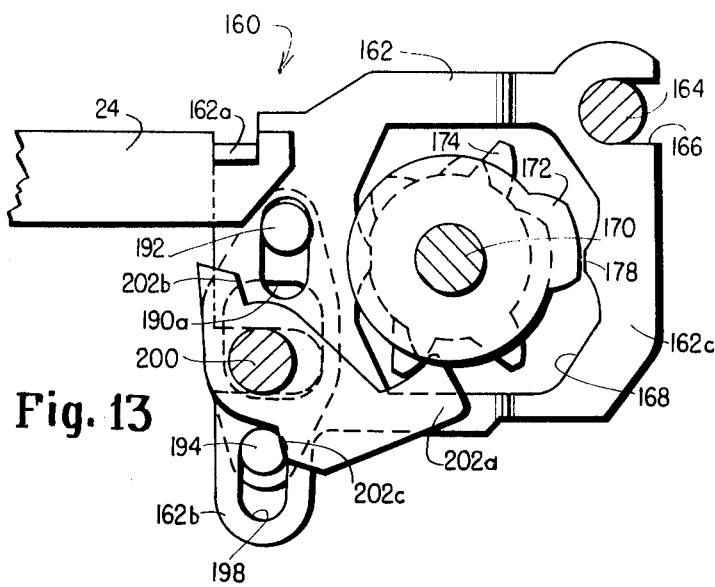
FIG. 13 is a detail view similar to FIGS. 11 and 12 illustrating the totalizer shaft in a subtract position and the sign responsive means in a position representing a positive total.

The position of the lever 184 is adjusted in the two intervals shown in line 3 of FIG. 15 in which the determination of the positive or negative nature of the total standing in the totalizer 22 is determined by the assembly 102. When the arm 114 and the shaft 134 are pivoted in a counterclockwise direction to the negative position shown in FIG. 5, the pinion gear 182 is similarly turned in a counterclockwise direction to pivot the lever 184 in a clockwise direction to the position illustrated in FIGS. 10 and 11 in which the pins 192 and 194 occupy the lower ends of the slots 196 and 198, respectively, in the plate 162. Alternatively, when the arm 114 and the shaft 134 are pivoted in a clockwise direction to the positive total setting shown in FIGS. 4 and 6 of the drawings, the pinion gear 182 is rotated in a clockwise direction, and the lever 184 is pivoted in a counterclockwise direction about the shaft to move the plate 190 to the left (FIG. 10) so that the pins 192 and 194 occupy the upper ends of the slots 196 and 198, respectively (FIG. 13). Thus, the positions of the pins 192 and 194 provide an indication in the assembly 160 of the positive or negative nature of the total standing in the totalizer 22. These pins are set during the latter portion of each operating cycle of the accounting machine or cash register and remain set in these positions at the initiation of the next cycle of operation.

Figure 11:
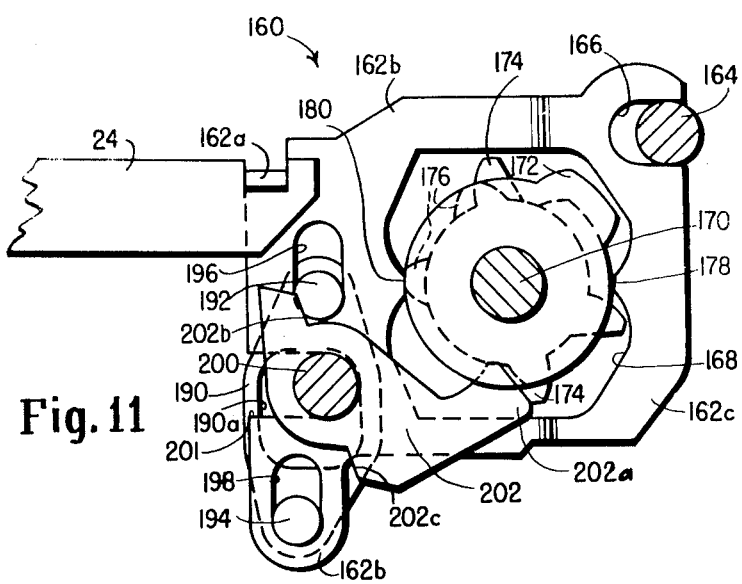
FIG. 11 is a detail view of the adjusting mechanism shown in FIG. 10 illustrating the totalizer shaft in an add position and a totalizer sign responsive means in a position representing a negative total.
Figure 14:
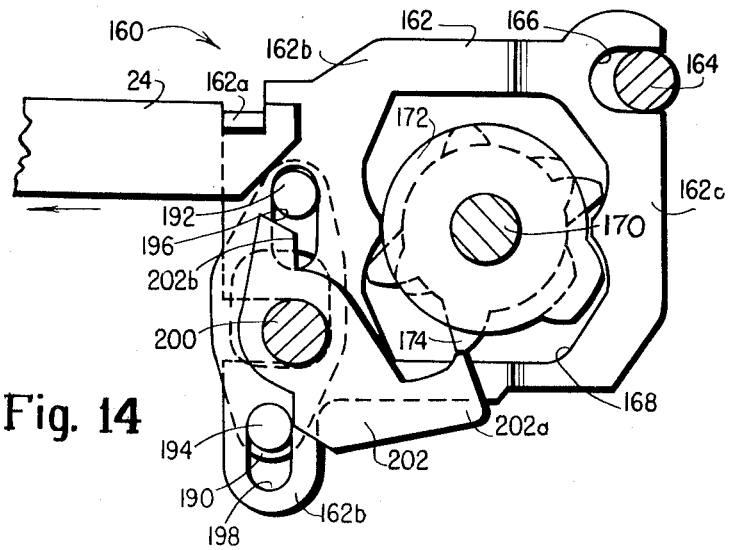
FIG. 14 is a detail view of the totalizer shaft shifting means in which the totalizer shaft has been shifted to an add position.

The shaft 170 which is set by, for instance, the mode of operation differential assembly in a cash register is actuated to its setting during an early portion of the operating cycle of the cash register or accounting machine. As an example, in the copending Englund et al. application referred to above, the mode of operation differential assembly is set between 20° and 93° of movement of the main shaft 78 of the cash register. This rotation of the shaft 170 is effective through the intermediate control cam 174 to adjust the position of the totalizer shaft 24 in accordance with the settings of the pins 192 and 194. More specifically, the assembly 160 includes a shaft 200 (FIGS. 11–14) mounted for rotary movement about a fixed axis relative to the frame of the accounting machine. The plate 162 is provided with a slot 201 for the shaft 200, and the plate 190 includes a similar opening 190a (FIG. 11). A lever 202 is rigidly secured to the shaft 200 and includes an end portion 202a that is adapted to bear against the projections on the cam 174. The lever 202 also includes a surface 202b that is adapted to bear against the side of the pin 192 (FIGS. 11 and 12) and a surface or portion 202c that is adapted to bear against the pin 194 (FIGS. 13 and 14).

Figure 12:
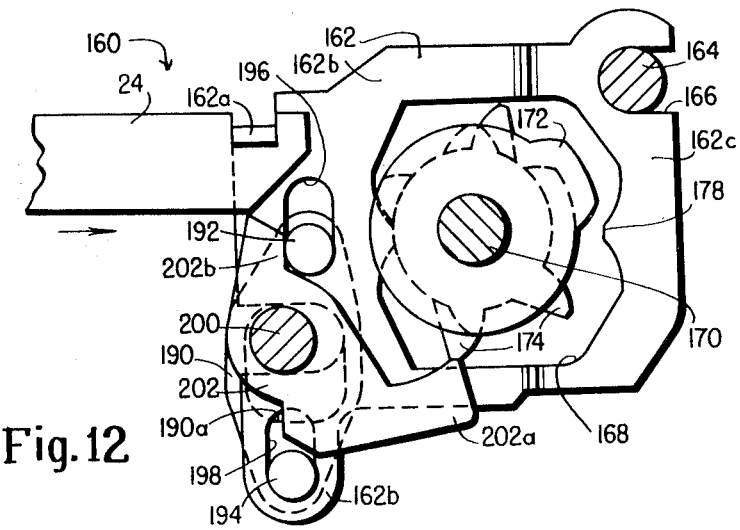
FIG. 12 is a detail view similar to FIG. 11 illustrating the totalizer shaft in a position representing a subtract operation.

Assuming that the totalizer shaft 24 is in its left-hand add setting illustrated in FIG. 11 and that the pins 192 and 194 are in their lower position representing a negative total standing in the add-subtract totalizer 22, the rotation of the shaft 170 to a position representing a selected operation in which the add-subtract totalizer 22 is to be used moves one of the projections on the cam 174 into engagement with the arm 202a on the lever 202 and pivots this lever about the fixed axis of rotation of the shaft 200 to the position shown in FIG. 12. In moving from the position shown in FIG. 11 to the position shown in FIG. 12, the portion 202b of the arm 202 bears against the left side of the pin 192 and forces this pin and, by engagement of the pin 192 with the plate 162, the plate 162 to the right from the position shown in FIG. 11 to the position shown in FIG. 12. This moves the totalizer 24 from the left-hand add position illustrated in FIG. 11 to the right-hand subtract position illustrated in FIG. 12. Thus, the totalizer is automatically moved to a subtract position in response to the presence of a negative total standing in this totalizer.

Similarly, if the totalizer shaft 24 is in its right-hand add position and the pins 192 and 194 are in their upper position representing a negative total standing in the add-subtract totalizer assembly 22 (FIG. 13), the movement of the shaft 170 toward a setting representing a particular type of operation in which the add-subtract totalizer 22 is to be used moves one of the projections on the cam 174 into engagement with the projecting portion 202a on the lever 202. This biases the surface or edge 202c on the lever 202 into engagement with the right side of the pin 194. During continuing rotation of the shaft 170 to the position illustrated in FIG. 14, the lever 202 is pivoted in a clockwise direction about the shaft 200 so that the portion 202c forces the pin 194 and the plate 162 to the left. By virtue of the connection between the plate 162 and the shaft 24, the totalizer assembly 22 is moved to the left to its add position so that this totalizer is adjusted to an add position when a positive total is standing in this totalizer. In this manner, the assembly 160 automatically adjusts the position of the shaft 24 in the add-subtract totalizer 22 between add and subtract positions in dependence on the type of operation for which the accounting machine is conditioned and in further dependence on the positive or negative nature of the total standing in this totalizer.

Although the present invention has been described with reference to one illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. In an accounting machine of the type including elements differentially settable to value representing positions, a main drive means that is operable through an operating cycle, a plural order totalizer for storing plural order digital entries and including at least some orders set under the control of the differentially settable elements, individual carry means each controlled by one order of the totalizer and operable to effect a carry into the adjacent order of the totalizer, and operating means actuated by the main drive means for operating the carry means in sequence, said operating means including means for operating the carry means of each of the various orders of the totalizer more than once during a cycle of operation of the main drive means and for operating the carry means for more than one order substantially concurrently, the concurrently operated carry means being spaced by at least one intervening order of the totalizer, the carry means in any one order being operated to effect an entry only once during a cycle of operation.

2. In an accounting machine of the type having elements differentially settable to value representing positions, a main drive means for operating the machine through a cycle of operation, a plural order totalizer including at least some orders set under the control of the differentially settable elements, a plurality of carry means controlled by the various orders of the totalizer for controlling the entry of a carry into an adjacent order, and operating means actuated by the main drive means for actuating the plurality of carry means more than once during a single cycle of operation of the main drive means with the actuation of the carry means in a given order overlapping in time with the actuation of the carry means in another order, the carry means in any one order being operated to effect an entry only once during a single cycle of operation.

3. In an accounting machine of the type including elements differentially settable to value representing positions, a main drive means that is operable through a cycle of operation, a plural order totalizer for storing plural order digital entries and including at least some orders set under the control of the differentially settable elements, individual carry means each controlled by one order of the totalizer and operable to effect a carry into the adjacent order of the totalizer only once during a single cycle of operation, and operating means actuated by the main drive means for sequentially actuating each carry means more than once during a single cycle of operation of the main drive means with the actuation of the carry means in a given order overlapping in time the actuation of the carry means for another order, said operating means including means for initiating the sequential operation of the carry means at different orders in the totalizer.

4. In an accounting machine of the type having elements differentially settable to value representing positions, a main drive means operable through a cycle of operation, a plural order totalizer for storing a plural digit data item and including at least some orders set under the control of the differentially settable elements, a plurality of carry means each operable to effect the entry of an increment of value into an order of the totalizer, a plurality of carry indicating means each operable during operation of the totalizer for controlling the operation of a related carry means to effect the entry of no more than one increment of value during a single cycle of operation, operator means for selectively operating the carry means under the control of the carry indicating means, and timing means driven by the main drive means for operating the operator means to actuate each carry means more than once during a single cycle of operation of the accounting machine, said timing means being so constructed and arranged as to operate the operator means for at least two carry means that are separated from each other by the carry means for more than one intervening order of the totalizer in a time overlapped relation.

5. The accounting machine set forth in claim 4 including additional carry means controlled by the highest order of the totalizer for entering a fugitive one in the lowest order of the totalizer only once during a cycle of operation, and means for operating said additional carry means more than once during a cycle of operation of the main drive means to permit the single entry of the fugitive one to occur at different times during the cycle of operation.

6. In an accounting machine of the type having elements differentially settable to value representing positions, a main drive means operable through a cycle of operation, a plural order totalizer for storing a plural digit data item and including at least some orders set under the control of the differentially settable elements, transfer means for effecting the entry of an increment of value into an order of the totalizer in dependence on the value setting of an adjacent order of the totalizer, operator means for selectively operating the transfer means, and cam means driven by the main drive means and operable to actuate each of the operator means a plurality of times during each cycle of operation of the main drive means, the transfer means in any one order being operated to effect an entry only once during a single cycle of operation, said cam means being arranged to actuate the operator means in serial order with the operation of the operator means in at least one group of orders overlapping in time with the operation of operator means in other orders.

7. An accounting machine of the type having means differentially settable to value representing positions, a plural order totalizer including at least some orders operable to value representing positions under the control of the differentially settable means, transfer indicating means for the different orders of the totalizer operable during and subsequent to the setting of the totalizer under the control of the differentially settable means to indicate the need for a transfer operation, transfer means controlled by the transfer indicating means for effecting a value transfer between adjacent orders of the totalizer, drive means operable through a single cycle of operation, and actuating mechanism for each of the transfer means, and actuating means operated by the drive means during a single cycle of operation for actuating the actuating mechanism for each transfer means a plurality of times that are spaced apart from each other, the transfer means in any one order being operated to effect a value transfer only once during a single cycle of operation, said actuating means being arranged to actuate the actuating mechanisms in serial order with the actuation of the actuating mechanisms in at least one group of orders overlapping in time the actuation of the actuating mechanisms in other orders.

References Cited by the Examiner

UNITED STATES PATENTS

| | | | |
|---|---|---|---|
| 1,288,333 | 12/1918 | Whiting | 235—1.8 |
| 2,147,359 | 2/1939 | Walter | 235—138 |
| 2,255,102 | 9/1941 | Carlstrom | 235—138 |
| 2,550,581 | 4/1951 | Mehan | 235—60.2 |
| 2,826,366 | 3/1958 | Capellaro | 235—137 |
| 2,969,177 | 1/1961 | Gubelmann | 235—137 |
| 2,987,244 | 6/1961 | Schulz | 235—60.2 |

LEO SMILOW, *Primary Examiner.*

LEYLAND M. MARTIN, *Examiner.*